US008186191B2

(12) United States Patent
Bacon

(10) Patent No.: US 8,186,191 B2
(45) Date of Patent: May 29, 2012

(54) REMOTELY OPERATED LOCKING PADDLE HANDLE LATCH ASSEMBLY FOR CLOSURES AND THE LIKE

(75) Inventor: Bruce C. Bacon, Rockford, MI (US)

(73) Assignee: Bauer Products, Inc.

( * ) Notice: Subject to any disclaimer, the term of this patent is extended or adjusted under 35 U.S.C. 154(b) by 0 days.

(21) Appl. No.: 12/952,230

(22) Filed: Nov. 23, 2010

(65) Prior Publication Data

US 2011/0126598 A1 Jun. 2, 2011

Related U.S. Application Data

(60) Provisional application No. 61/264,935, filed on Nov. 30, 2009.

(51) Int. Cl.

| | |
|---|---|
| ***B60R 25/02*** | (2006.01) |
| ***B62H 5/04*** | (2006.01) |
| ***E05B 13/10*** | (2006.01) |
| ***F16C 3/00*** | (2006.01) |
| ***G05G 5/00*** | (2006.01) |

(52) U.S. Cl. ................ 70/208; 70/256; 70/257; 70/277; 70/279.1; 70/283.1; 292/DIG. 31; 292/40; 292/201; 292/216

(58) Field of Classification Search .................... 70/208, 70/256, 257, 277, 279.1, 283.1; 292/DIG. 31, 292/40, 201, 216

See application file for complete search history.

(56) References Cited

U.S. PATENT DOCUMENTS

| | | | | |
|---|---|---|---|---|
| 4,677,834 | A * | 7/1987 | Hicks | 70/279.1 |
| 4,892,338 | A * | 1/1990 | Weinerman et al. | 292/35 |
| 4,986,576 | A * | 1/1991 | Anderson | 292/40 |
| 5,127,686 | A | 7/1992 | Gleason et al. | |
| 5,595,076 | A * | 1/1997 | Weinerman et al. | 70/208 |
| 5,606,882 | A * | 3/1997 | Larsen et al. | 70/369 |
| 5,927,773 | A | 7/1999 | Larsen et al. | |
| 6,409,234 | B1 * | 6/2002 | Larsen et al. | 292/173 |
| 6,513,353 | B1 * | 2/2003 | Weinerman et al. | 70/208 |
| 6,651,467 | B1 | 11/2003 | Weinerman et al. | |
| D485,155 | S * | 1/2004 | Bacon | D8/338 |
| 6,685,240 | B2 | 2/2004 | Bacon | |
| 6,701,761 | B1 * | 3/2004 | Chang et al. | 70/337 |
| 6,708,537 | B1 * | 3/2004 | Eschweiler et al. | 70/208 |
| 6,758,503 | B2 | 7/2004 | Sadler | |
| 6,845,641 | B2 * | 1/2005 | Hsieh | 70/257 |
| 6,854,304 | B2 | 2/2005 | Linares | |
| 6,857,298 | B2 | 2/2005 | Linares | |
| 6,962,375 | B2 | 11/2005 | Linares | |
| 7,237,812 | B2 * | 7/2007 | Tweedy | 292/40 |
| 2007/0056338 | A1 * | 3/2007 | Sabo et al. | 70/257 |
| 2008/0258867 | A1 * | 10/2008 | Harris et al. | 340/5.64 |
| 2010/0300162 | A1 * | 12/2010 | Cappuccio et al. | 70/257 |

* cited by examiner

*Primary Examiner* — Suzanne Barrett
*Assistant Examiner* — David E Sosnowski
(74) *Attorney, Agent, or Firm* — Price Heneveld LLP

(57) ABSTRACT

A locking paddle handle assembly for closures has a housing with a paddle handle pivotally mounted therein, a latch which latches and unlatches the closure upon rotation of the paddle handle, and a exterior key lock with a movable member that shifts between locked and unlocked positions. A deadbolt lock selectively engages the closure frame in the locked position to positively retain the closure closed. The deadbolt lock is operably connected with the movable key lock member, such that movement of the latter between the latched and unlatched positions contemporaneously shifts the deadbolt lock between the locked and unlocked positions. A remotely operable controller is operably connected with the deadbolt lock to power shift the same between the locked and unlocked positions from a remote location.

7 Claims, 6 Drawing Sheets

REMOTELY OPERATED LOCKING PADDLE HANDLE LATCH ASSEMBLY FOR CLOSURES AND THE LIKE

CROSS-REFERENCE TO RELATED APPLICATIONS AND CLAIM TO PRIORITY

The present invention is related to commonly assigned, U.S. patent application Ser. No. 12/639,516, filed Dec. 16, 2009, entitled LOCKING PADDLE HANDLE LATCH ASSEMBLY FOR CLOSURES AND THE LIKE, which is hereby incorporated herein by reference, and claims priority under 35 U.S.C. §119(e) to related provisional U.S. Patent Application Ser. No. 61/264,935, filed Nov. 30, 2009.

BACKGROUND OF THE INVENTION

The present invention relates to latches for movable closures and the like, and in particular to a remotely operated locking paddle handle latch assembly.

Paddle handles are generally well known in the art, and are typically flush mounted on an associated closure or door to facilitate selectively shifting the closure between an open unlatched position and closed latched position. Paddle handle assemblies are used widely on entry doors for recreational vehicles, motor homes and the like, and in such applications, require that the latch mechanism be accessible and operable from both the inside and the outside of the vehicle, and that they include a deadbolt lock for maximum security.

Heretofore, paddle handle assemblies have proven generally effective, although they experience certain drawbacks. For example, such prior art paddle handle assemblies are not particularly adapted for use with remotely operated power actuators, which have become quite popular in the recreational vehicle industry. Hence, a paddle handle assembly which overcomes such drawbacks would clearly be advantageous.

SUMMARY OF THE INVENTION

One aspect of the present invention is a remotely operated locking paddle handle assembly for closures and the like having a housing adapted for mounting in or adjacent an associated closure of the type that can be shifted between an open position and a closed position. A paddle handle is pivotally mounted in an interior portion of the housing for rotation between a retracted position and an extended position. A latch is operably connected with the paddle handle, and configured such that when the paddle handle is in the retracted position, the latch is in the latched position, wherein the closure cannot be unintentionally shifted from the closed position, and when the paddle handle is in the extended position, the latch is in an unlatched position, wherein the closure is free to be shifted from the closed position to the open position. A key lock is mounted on an exterior portion of the housing, and includes a movable key lock member that is selectively moveable between a locked position and an unlocked position. A deadbolt lock is movably mounted in the housing for shifting between a locked position, wherein the closure is positively retained in the closed position, and an unlocked position, wherein the closure is free to be shifted between the open position and closed position. The deadbolt lock is operably connected with the movable key lock member, whereby movement of the movable key lock member between the locked and unlocked positions shifts the deadbolt lock between the locked and unlocked positions. A remotely operated controller is operably connected with the deadbolt lock, and when activated, shifts the deadbolt lock between the locked and unlocked positions from a remote location.

Another aspect of the present invention is a remotely operated paddle handle assembly that has an uncomplicated design which is efficient in use, economical to manufacture, capable of a long operating life, and particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
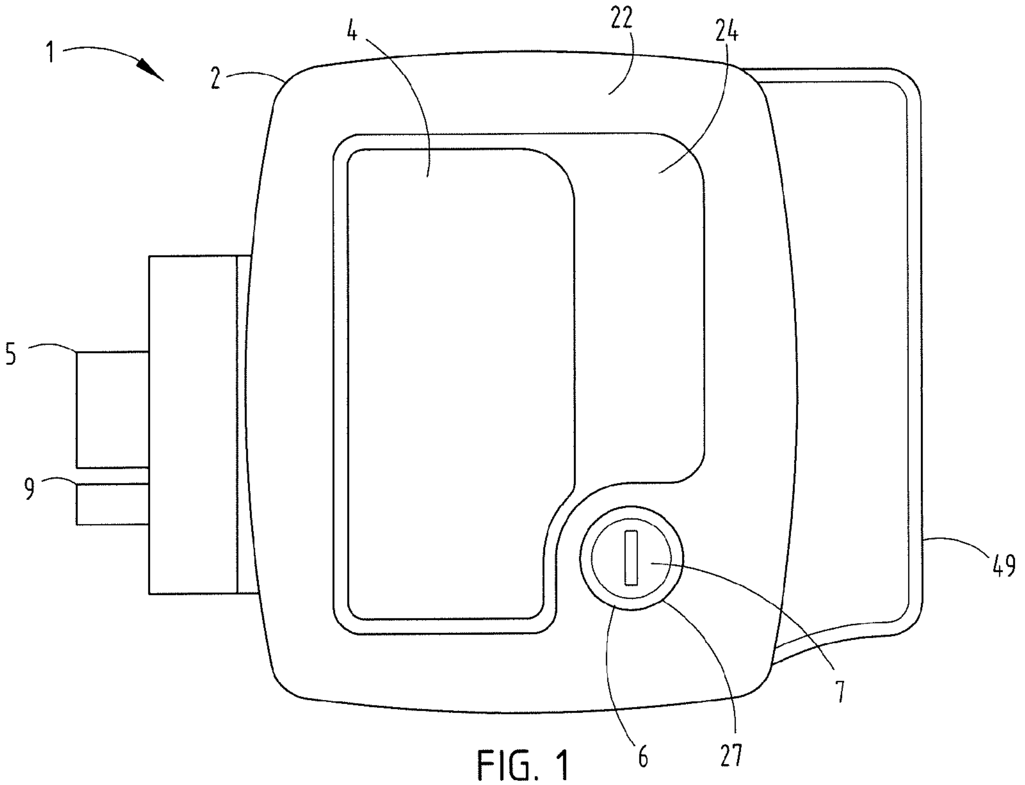
FIG. 1 is a front elevational view of a remotely operated locking paddle handle latch assembly embodying the present invention.
Figure 2:
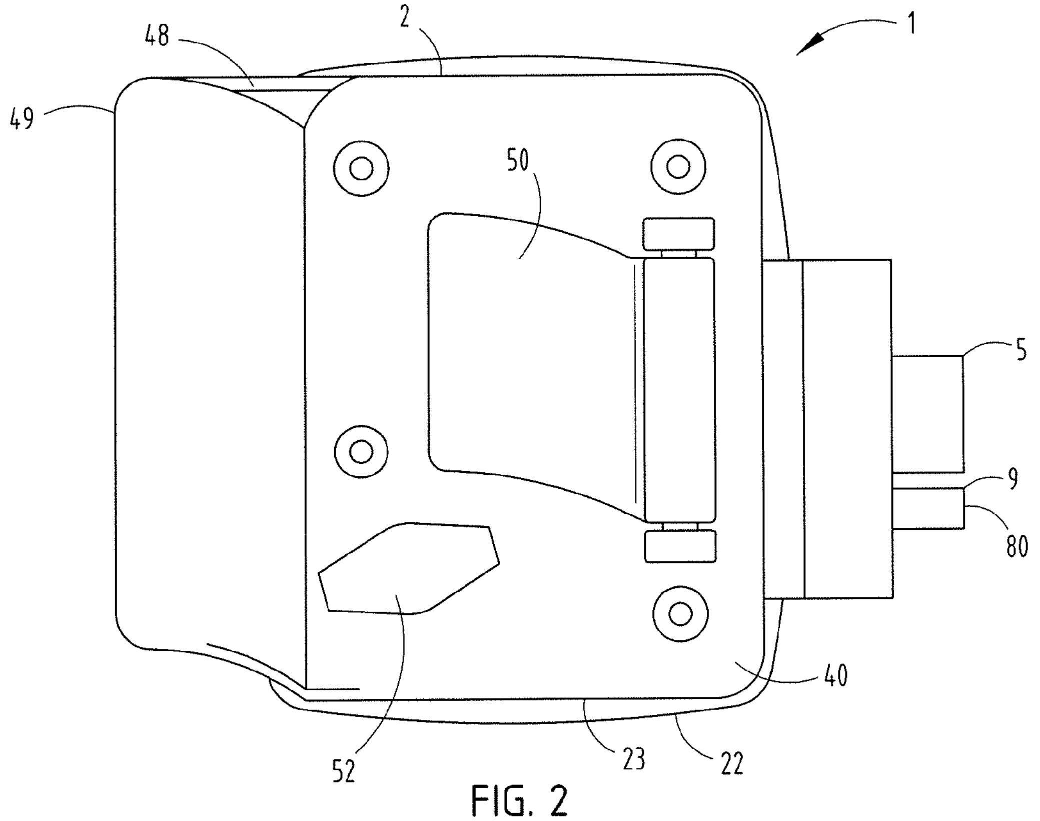
FIG. 2 is a rear elevational view of the paddle handle latch assembly.
Figure 3:
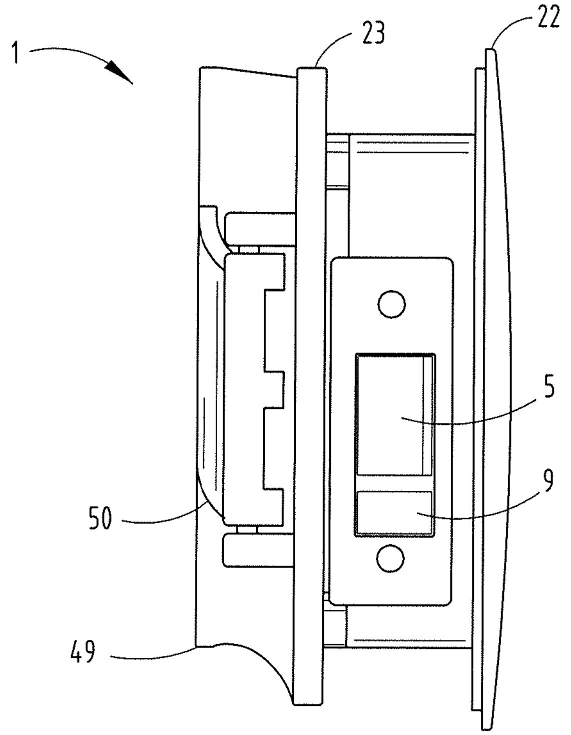
FIG. 3 is a left-hand side elevational view of the lockable paddle handle latch assembly.
Figure 4:
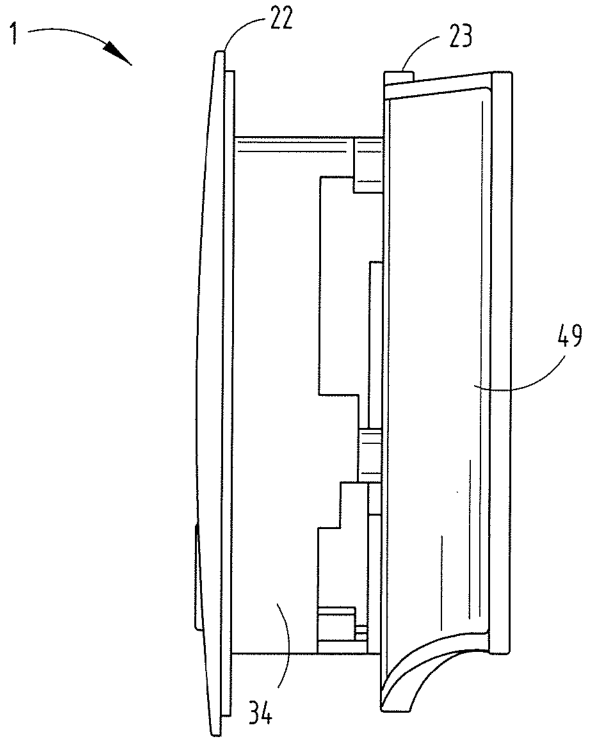
FIG. 4 is a right-hand side elevational view of the lockable paddle handle latch assembly.
Figure 5:
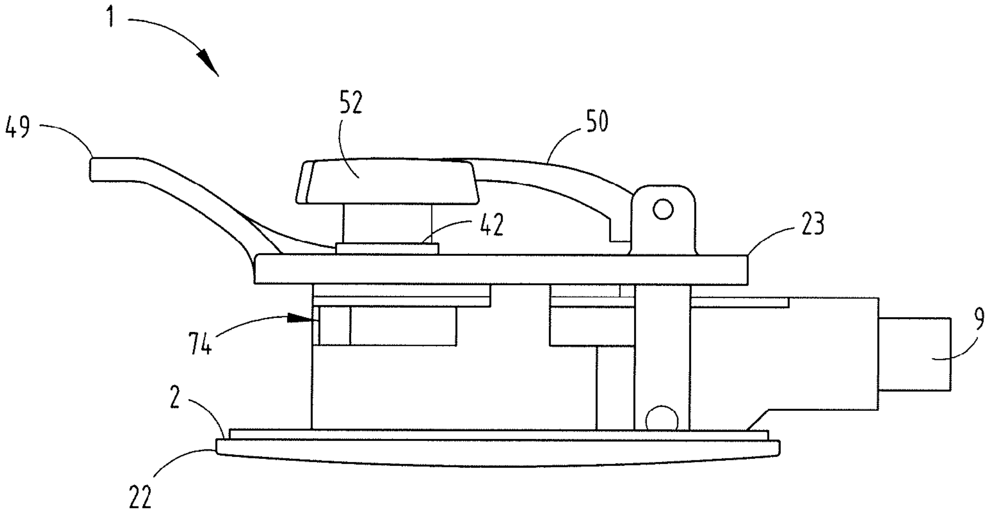
FIG. 5 is a bottom elevational view of the lockable paddle handle latch assembly.
Figure 6:
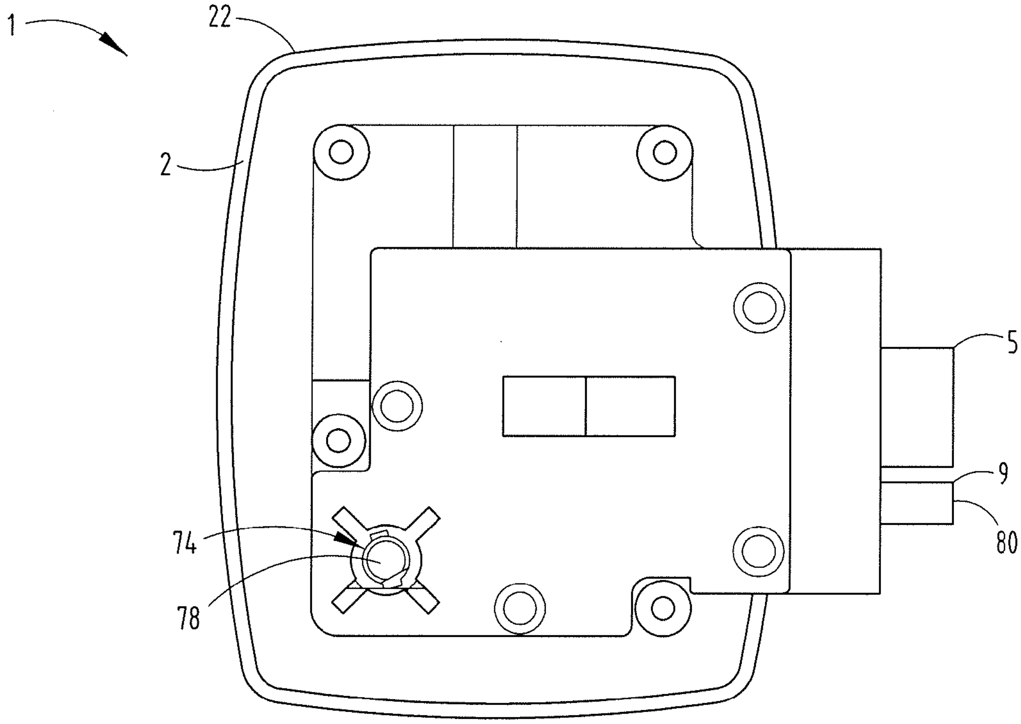
FIG. 6 is a rear elevational view of the lockable paddle handle latch assembly, wherein portions thereof have been broken away to reveal internal construction.
Figure 7:
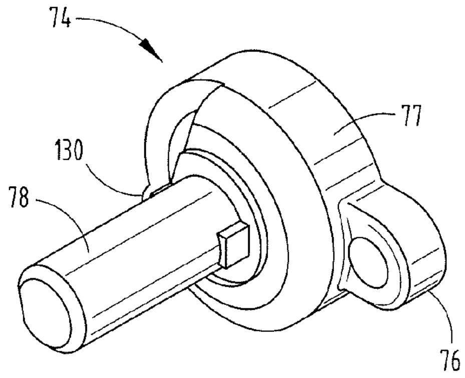
FIG. 7 is a perspective view of a deadbolt lock cam portion of the lockable paddle handle latch assembly.
Figure 8:
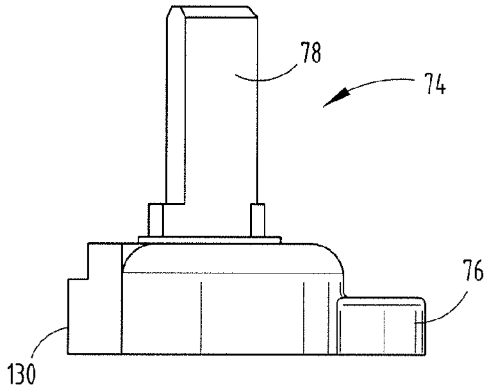
FIG. 8 is a side elevational view of the deadbolt lock cam.
Figure 9:
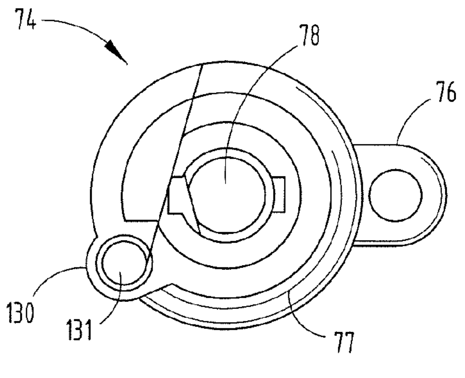
FIG. 9 is a front elevational view of the deadbolt lock cam.
Figure 10:
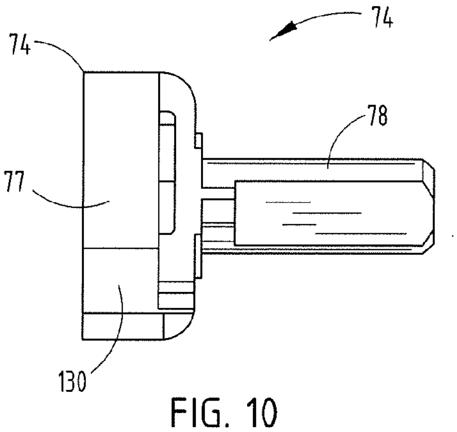
FIG. 10 is another side elevational view of the deadbolt lock cam.

For purposes of description herein, the terms “upper”, “lower”, “right”, “left”, “rear”, “front”, “vertical”, “horizontal” and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 11:
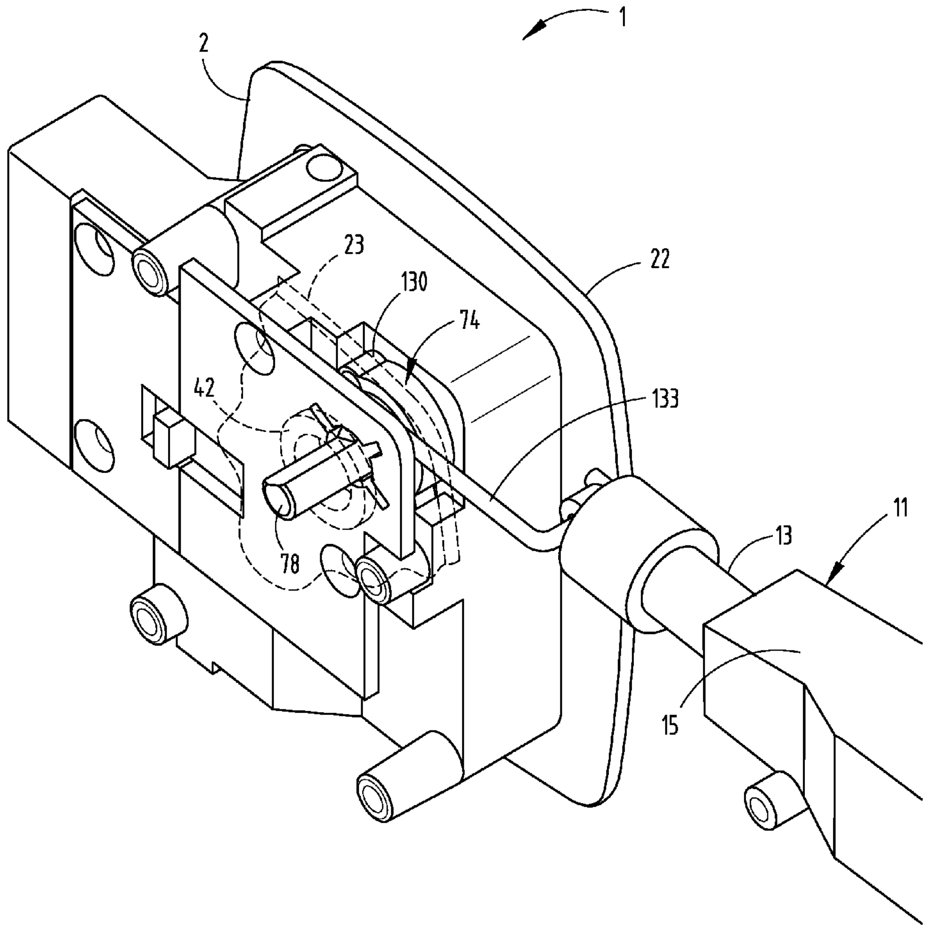
FIG. 11 is a perspective view of the paddle handle latch assembly shown with an associated remotely operated controller.
Figure 12:
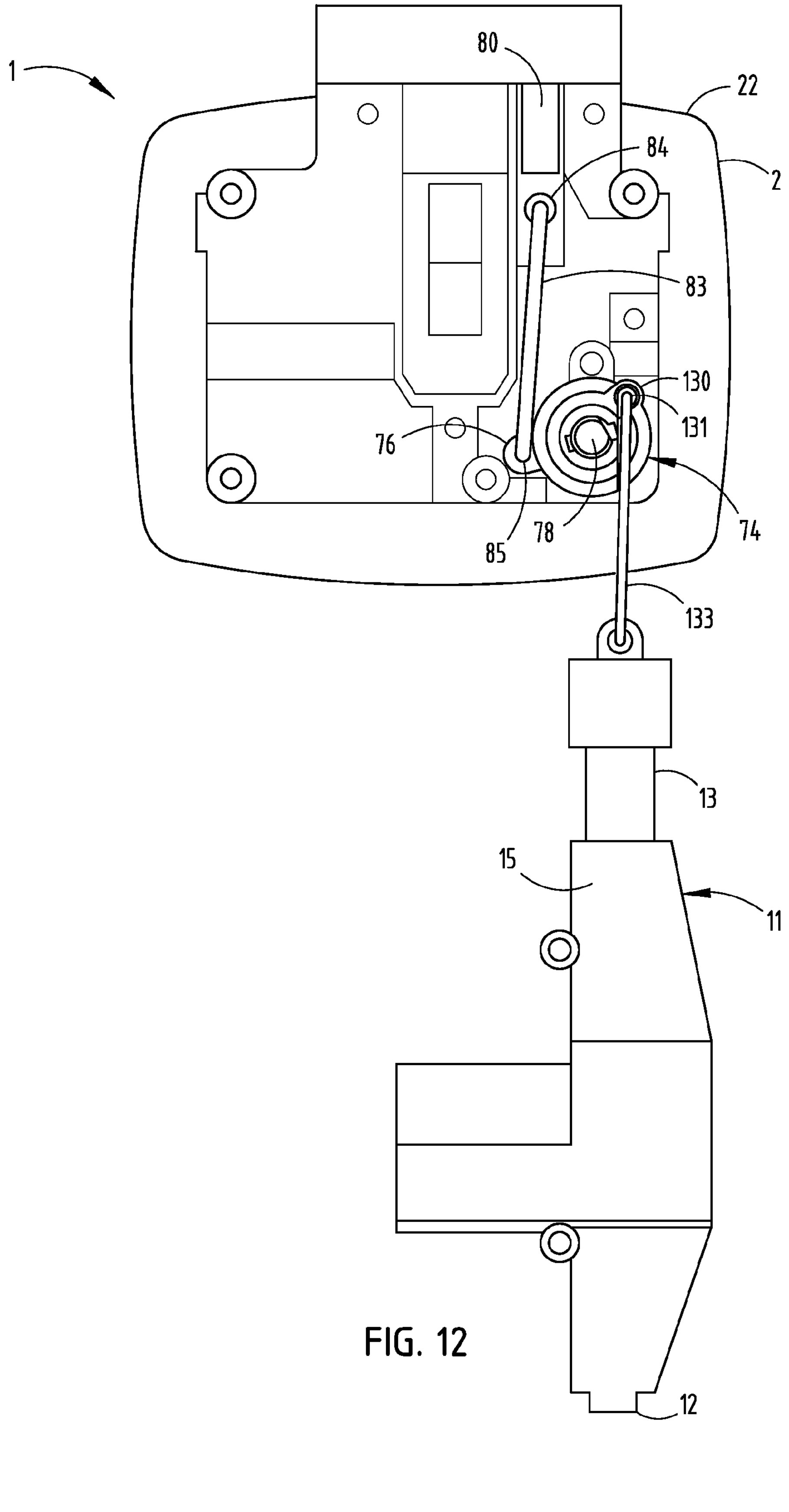
FIG. 12 is a rear elevational view of the paddle handle latch assembly with portions thereof broken away to reveal internal construction, along with the remotely operated controller.

The reference numeral 1 (FIGS. 1-4) generally designates a remotely operated locking paddle handle latch assembly embodying the present invention. Locking paddle handle latch assembly 1 includes a housing 2 adapted for mounting in or adjacent to an associated closure of the type that can be shifted between an open position and a closed position. A paddle handle 4 is pivotally mounted in an interior portion of housing 2 for rotation between a retracted position and an extended position. A latch 5 is operably connected with paddle handle 4, and configured such that when paddle handle 4 is in the retracted position, latch 5 is in a latched position, wherein the closure cannot be unintentionally shifted from the closed position, and when paddle handle 4 is in the extended position, latch 5 is in an unlatched position, wherein the closure is free to be shifted from the closed position to the open position. A key lock 6 is mounted on an exterior portion of housing 2, and includes a movable key lock member 7 that is selectively movable between a locked position and an unlocked position. A deadbolt lock 9 is mounted in housing 2 for shifting between a locked position, wherein the closure is positively retained in the closed position, and an unlocked position, wherein the closure is free to be shifted between the open and closed positions. Deadbolt lock 9 is operably connected with movable key lock member 7, such that movement of the movable key lock member 7 between the locked and unlocked positions shifts the deadbolt lock 9 between the locked and unlocked positions. A remotely operated controller 11 (FIGS. 11 and 12) reciprocates between locked and unlocked positions, and is operably connected with deadbolt lock 9 to shift the same between the locked and unlocked positions from a remote location.

As best illustrated in FIGS. 1-5, the illustrated housing 2 has a two part construction, comprising an exterior plate 22 in which paddle handle 4 is pivotally mounted, and an interior plate 23 which mounts on the interior of the closure and is attached to exterior plate 22 by fasteners. The illustrated exterior plate 22 includes a centrally disposed, bowl-shaped recess 24 located directly behind paddle handle 4 which provides finger access to facilitate rotation of paddle handle 4 between the retracted and extended positions. The bottom wall of recess 24 includes an actuator window through which an actuator tab on paddle handle 4 extends to operate latch 5. The marginal portion of exterior plate 22 includes a lock aperture 27 in which key lock 6 is mounted.

The inside surface of exterior plate 22 includes a cylindrically-shaped lock boss 34, the interior of which defines lock aperture 27. The interior plate 23 of housing 2 includes a marginal portion 40 which engages the interior surface of the closure, as well as fastener bosses 41 and a lock boss 42. The rearwardmost or interior side edge 48 of interior plate 23 is contoured to define a stationary interior handle 49 which facilitates opening and closing the closure from the interior portion of the vehicle. A release lever 50 is pivotally mounted on the interior surface of interior plate 23. Release lever 50 includes a forwardly protruding actuator tab which extends through to the latch 5 to selectively shift the same to the unlatched position. An interior lock knob 52 is pivotally received in lock boss 42 on the interior plate 23, and is operably connected with the deadbolt lock 9 as described below.

In the illustrated example, the moveable key lock member 7 is in the form of a cylindrical lock plug which is received in the lock aperture 27 on the exterior housing plate 22, and is rotatably mounted in lock boss 34 for rotation between locked and unlocked positions. A multi-arm deadbolt lock cam 74 is pivotally mounted in the interior end of lock boss 34, and is operably connected with key lock member 7 for rotation therewith. The illustrated deadbolt lock cam 74 has a first crank arm 76 that is operably connected with deadbolt lock 9. As best illustrated in FIGS. 7-10, deadbolt lock cam 74 has a cylindrically-shaped base 77 with a recessed end oriented toward exterior housing plate 22 and a faced shaft 78 oriented toward interior housing plate 23. The shaft 78 on deadbolt lock cam 74 extends through the lock boss 42 in the interior housing plate 23, and the lock knob 52 is mounted on the interior end thereof, such that rotation of lock knob 52 from the interior of the vehicle rotates deadbolt lock cam 74 between the locked and unlocked positions, and simultaneously shifts the deadbolt lock 9 between the locked and unlocked positions.

The illustrated deadbolt lock 9 includes a deadbolt 80 slidably mounted in the exterior housing plate 22, and includes an outer end which extends exterior of housing 2 for engagement with an associated strike bolt assembly, and an inner end which extends interior of housing 2. A link 83 has a first end 84 thereof pivotally connected with the inner end 82 of deadbolt 80, and a second end 85 thereof pivotally connected with the first crank arm 76 of lock cam 74, such that rotation of key lock member 7 between the locked and unlocked positions longitudinally shifts the deadbolt 80 between the locked and unlocked positions.

The multi-arm lock cam 74 also includes a second crank arm 130, which is adapted for operable connection with remotely operable controller 11, which rotates lock cam 74, and shifts the deadbolt lock 9 between the locked and unlocked positions. More specifically, crank arm 130 includes an aperture 131 adjacent its outer end into which an actuator rod 133 is received, which is operably connected with remotely operable controller 11, which is typically mounted in the vehicle door. In the illustrated example, remotely operated controller 11 includes a linear actuating device 15 in the form of a solenoid or the like, which has a plunger portion 13 that shifts or reciprocates longitudinally between locked and unlocked positions in response to a remotely generated signal. The illustrated remotely operable controller 11 also includes a signal receiver portion 12 which actuates the motor upon detection of an appropriate radio frequency signal or the like. Remote actuation of the controller 11 longitudinally shifts the actuator rod 133, which in turn rotates deadbolt lock cam 74 and shifts deadbolt 80 between the locked and unlocked positions.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A remotely operated locking paddle handle latch assembly for closures and the like, comprising:

a housing adapted for mounting adjacent an associated closure of the type that can be shifted between an open position and a closed position;

a paddle handle pivotally mounted in an exterior portion of said housing for rotation between a refracted position and an extended position;

a latch operably connected with said paddle handle, and configured such that when said paddle handle is in said retracted position, said latch is in a latched position, wherein the closure cannot be unintentionally shifted from the closed position, and when said paddle handle is in said extended position, said latch is in an unlatched position, wherein the closure is free to be shifted from the closed position to the open position;

a key lock mounted on said exterior portion of said housing, and including a movable key lock member rotatable mounted in said key lock for selectively pivoting between a locked position and an unlocked position;

a deadbolt lock movably mounted in said housing for shifting between a locked position, wherein the closure is positively retained in the closed position, and an unlocked position, wherein the closure is free to be shifted between the open and closed positions; said deadbolt lock being operably connected with said movable key lock member, whereby movement of said movable key lock member between said locked and unlocked positions shifts said deadbolt lock between said locked and unlocked positions;

a remotely operable controller operably connected with said deadbolt lock and power shifting the same between said locked and unlocked positions from a remote location; and a multi-arm lock cam rotatably mounted in said housing and operably connected with said key lock member for rotation therewith; said lock cam having a first crank arm operably connected with said deadbolt lock and a second crank arm operably connected with said remotely operable controller.

2. A remotely operated locking paddle handle latch assembly as set forth in claim 1, wherein:

said deadbolt lock includes a deadbolt having a locked and an unlocked position slidably mounted in said housing with an outer end thereof which extends exterior of said housing, an inner end thereof which extends interior of said housing, and a first link having a first end thereof pivotally connected with said inner end of said deadbolt, and a second end thereof pivotally connected with said first crank arm of said lock cam, such that rotation of said key lock member between said locked and unlocked positions longitudinally shifts said deadbolt between said locked and unlocked positions.

3. A remotely operated locking paddle handle latch assembly as set forth in claim 2, wherein:

said remotely operable controller includes a linear actuating device and a signal receiver which actuates said linear actuating device upon detection of a predetermined signal.

4. A remotely operated locking paddle handle latch assembly as set forth in claim 3, wherein:

said linear actuating device includes a reciprocating plunger; and including an actuator rod having an outer end thereof pivotally connected with an outer end of said plunger and an inner end thereof pivotally connected with said second crank arm of said lock cam, whereby reciprocation of said plunger rotates said lock cam and longitudinally slides said deadbolt between said locked and unlocked positions.

5. A remotely operated locking paddle handle latch assembly as set forth in claim 4, wherein:

said linear actuating device comprises a solenoid.

6. A remotely operated locking paddle handle latch assembly as set forth in claim 5, including:

a fixed handle operably connected with an interior portion of said housing and shaped to facilitate manually shifting the closure between the open and closed positions from an interior side of the closure.

7. A remotely operated locking paddle handle latch assembly as set forth in claim 6, including:

an interior lock actuator mounted on said interior portion of said housing, and operably connected with said lock cam for rotation therewith, such that shifting said interior lock actuator between locked and unlocked positions shifts both said deadbolt lock and said latch lock between said locked and unlocked positions.

* * * * *